(12) United States Patent
De Berardinis

(10) Patent No.: US 8,302,837 B1
(45) Date of Patent: Nov. 6, 2012

(54) SOLDER FEEDER

(76) Inventor: Fred De Berardinis, Plaistow, NH (US)

( * ) Notice: Subject to any disclaimer, the term of this patent is extended or adjusted under 35 U.S.C. 154(b) by 0 days.

(21) Appl. No.: 12/931,381

(22) Filed: Jan. 31, 2011

(51) Int. Cl.
B23K 1/00 (2006.01)

(52) U.S. Cl. ............. 228/41; 228/52; 228/244; 226/127

(58) Field of Classification Search ............ 228/52, 228/256, 41, 244; 226/127
See application file for complete search history.

(56) References Cited

U.S. PATENT DOCUMENTS

| 2,821,947 | A | 2/1958 | Von Knauf |
| 2,952,763 | A | 9/1960 | Gustafsson |
| 3,896,982 | A | 7/1975 | Redman |
| 4,247,137 | A | 1/1981 | St. Clair |
| 4,330,075 | A | 5/1982 | Rosén |
| D266,980 | S | 11/1982 | Fortune |
| 4,411,379 | A | 10/1983 | Gravel |
| 4,793,541 | A * | 12/1988 | Dravnieks ............ 228/52 |
| 5,421,505 | A * | 6/1995 | Hild, II ............ 228/41 |
| 5,813,591 | A | 9/1998 | Quinn et al. |
| D517,384 | S | 3/2006 | Ishii et al. |

* cited by examiner

Primary Examiner — Nicholas D'Aniello
(74) Attorney, Agent, or Firm — Joseph R. Birkner

(57) ABSTRACT

A solder feeder having a housing member with a proximal end and a distal end. A guide member fixed to an interior wall of the housing member and extending through and projecting from the housing member for receiving solder. A trigger, having in combination, a short portion having a plurality of teeth thereon and a long portion. The trigger pivotably attached to the housing member so that the short portion of the trigger extending through an opening in a wall of the housing member in alignment with and cooperating with a slot in a wall of the guide member and the long portion extending externally along a length of the housing member.

14 Claims, 2 Drawing Sheets

SOLDER FEEDER

FIELD OF THE INVENTION

This invention relates generally to solder and wire feeding devices. More particularly, the present invention relates to a hand held solder feeder for dispensing solder.

BACKGROUND OF THE INVENTION

Prior art devices and methods for feeding solder are designed for use in combination with soldering irons and soldering guns where the solder is directed to the tip of the soldering iron or gun typically for electronic soldering applications. Such devices are complicated, bulky, typically can not retract solder, have numerous parts and are specifically designed to fit only a particular soldering iron or soldering gun. They can not be readily used as a stand-alone solder feeder.

For soldering plumbing fixtures such as copper tubes, solder is usually dispensed by hand from a spool to the tube and fittings which are heated by a torch using gas such as propane or acetylene. Using both hands, the pipefitter unrolls about four inches of solder, straightens it out and uses the spool as a handle. The pipefitter lights the torch and directs the flame to the joint of the fixture to be soldered. The solder is held at the heated joint after cleaning until the joint has taken enough solder as evidenced by external solder build up and by dripping. If there is insufficient solder available during soldering, the pipefitter must extinguish the torch, put it aside, unroll more solder, straighten it repeatedly until the job is done. However, the tip of the solder is very hot and the chance of injury to the pipefitter is highly likely. It is important that joints be heated uniformly to avoid overheating damage and to obtain leak proof connections, however, removing the torch from a plumbing fixture because of unavailable solder, causes unwanted cooling which leads to improper connections. Reheating a cooled joint can cause damage to the fitting. This results in expending a great deal of time and manual labor to troubleshoot, test and repair defective joints. Furthermore, when working in tight, hard to reach spaces such as in close proximity to a combustible wall, there is a great risk of fire, especially for less experienced do-it-yourselfers. Therefore, it is very important that the fixtures be heated as quickly and as uniformly as possible and the melting solder be continuously fed into the joint as fast as possible.

The inventor recognized a never before addressed problem of feeding solder with one hand with a portable device for use in soldering plumbing joints and fulfilled a need which overcomes the limitations and issues associated with the prior art devices and methods.

In view of the above, it was recognized by the present inventor that there is an unfulfilled need for a hand held solder feeder having few parts that efficiently delivers solder to a joint in a fast and safe manner.

Accordingly, it becomes clear that there is a great need for a solder feeder which overcomes the disadvantages associated with present solder dispensers and methods. Such a solder feeder should be one that works as desired, is safe and easy to use and is economically manufactured.

SUMMARY OF THE INVENTION

It is therefore an object of this invention to provide a solder feeder which avoids the aforementioned problems of prior art solder feeders and methods.

It is another object of this invention to provide a solder feeder that is usable for soldering plumbing fixtures heated by a gas torch.

It is another object of this invention to provide a solder feeder that is lightweight, portable and has few parts.

It is another object of this invention to provide a solder feeder that can be operated with one hand using as few as a single moving part.

It is another object of this invention to provide a solder feeder that is independent of a soldering iron or a soldering gun.

It is another object of this invention to provide a solder feeder that can advance and retract solder without binding.

It is a further object of this invention to provide a solder feeder which may be manufactured from readily available materials by conventional manufacturing processes.

It is still a further object of this invention to provide a solder feeder that is simple in design, simple to manufacture, low in cost, safe and is easy and fun to use.

This invention results from the realization that there is a great need for a highly functional solder feeder suitable for plumbing applications; the resulting invention provides such benefits.

According to a first aspect of the present invention, disclosed is a solder feeder comprising a housing member having a proximal end and a distal end. A guide member fixed to an interior wall of the housing member and extending through and projecting from the housing member for receiving solder. A trigger, having in combination, a short portion having a plurality of teeth thereon and a long portion. The trigger pivotably attached to the housing member so that the short portion of the trigger extending through an opening in a wall of the housing member in alignment with and cooperating with a slot in a wall of the guide member and the long portion extending externally along a length of the housing member.

The second aspect, in accordance with the present invention, is a special case of the first aspect of this invention with additional features.

The third aspect in accordance with the present invention, is a method of fabricating a solder feeder.

The fourth aspect in accordance with the present invention, is a method of using a solder feeder to dispense solder.

BRIEF DESCRIPTION OF THE DRAWINGS

In the accompanying drawings:

FIG. 3 is an enlarged cross sectional view of the solder feeder of FIG. 2 along the line 3-3.

DETAILED DESCRIPTION OF ILLUSTRATIVE EMBODIMENTS

Figure 1:
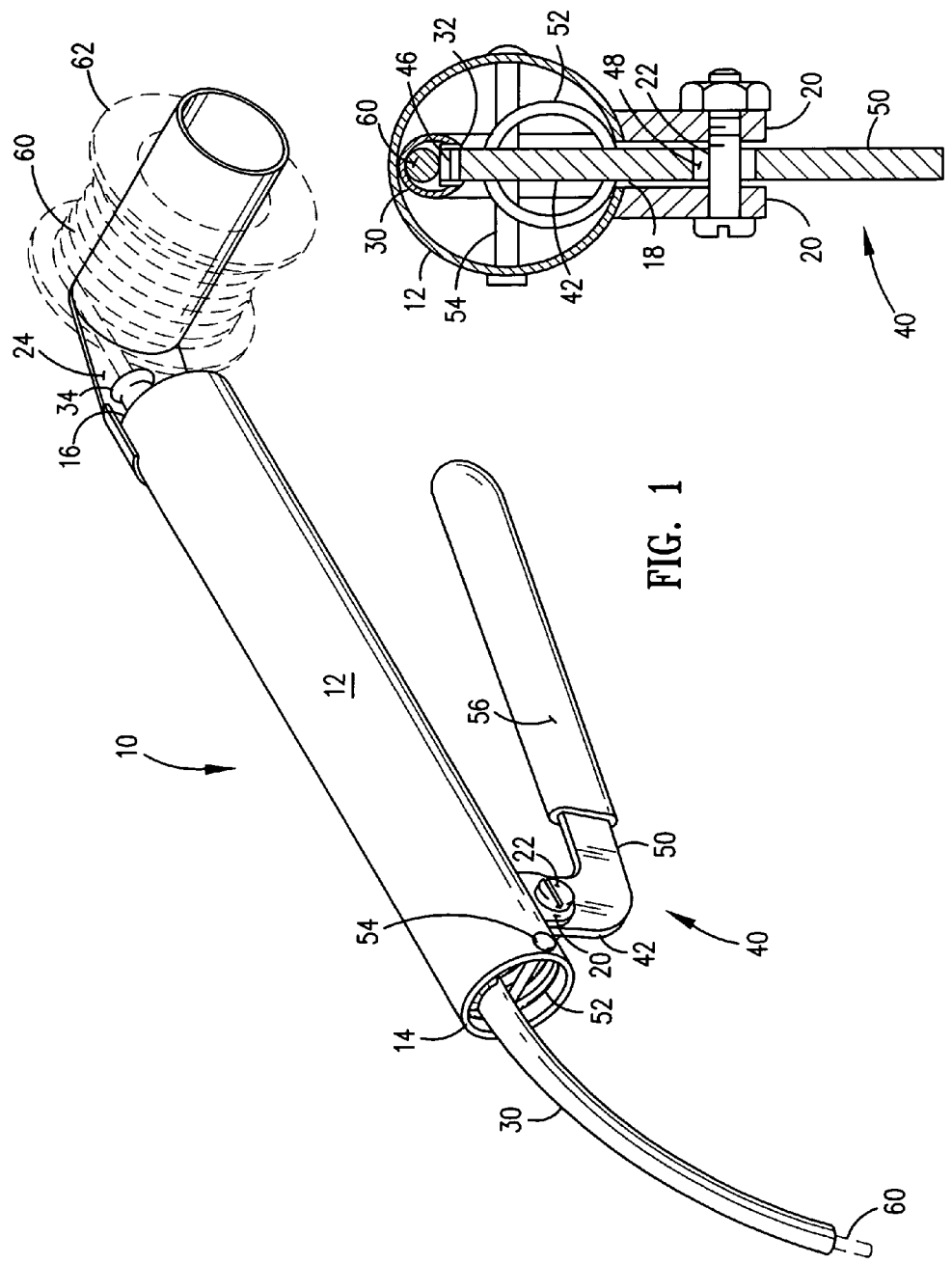
FIG. 1 is a perspective view of an illustrative embodiment of a solder feeder of the instant invention with a spool and solder shown in phantom.

Looking more particularly to the drawings, there is shown in FIG. 1 an illustrative embodiment of a solder feeder, which is generally indicated at 10, according to an embodiment of the present invention.

FIG. 1 shows a solder feeder 10 comprising a housing member 12 having a proximal end 14 and a distal end 16. A guide member 30 is fixed to an interior wall of housing member 12 and extending through and projecting from housing member 12. Housing member 12 and guide member 30 each having a hollow passage therein each of which may be a tube. A trigger 40, is pivotably attached to housing member 12 with a tab 20 at a pivot 22. Trigger 40 having in combination, a short portion 42, with an elongated hole 48 therein, extending through a wall of housing member 12 and a long portion 50 extending externally along a length of housing member 12. Trigger 40 being movable in a horizontal and in a vertical direction. Solder 60 and spool 62 are shown in phantom. As better seen in FIGS. 2 and 3, a plurality of teeth 46 are disposed on short portion 42 that engages solder 60 fed through guide member 30 from spool 62 rotatively disposed on a bracket 24 at distal end 16 of housing member 12 to proximal end 14 of housing member 12 via an opening in a wall, such as a slot 32, of guide member 30. Long portion 50 provides leverage to advance and to retract solder 60. Although not needed for operation, long portion 50 may have a friction increasing grip 56 including finger grips (not shown); guide member 30 may be a tube having a flare 34 on at least one end of guide member 30; the tube may be bendable to facilitate solder 60 feeding about circular plumbing fittings and trigger 40 may have, for convenience, a spring 52, serving as a return, with a spring retainer 54.

Figure 2:
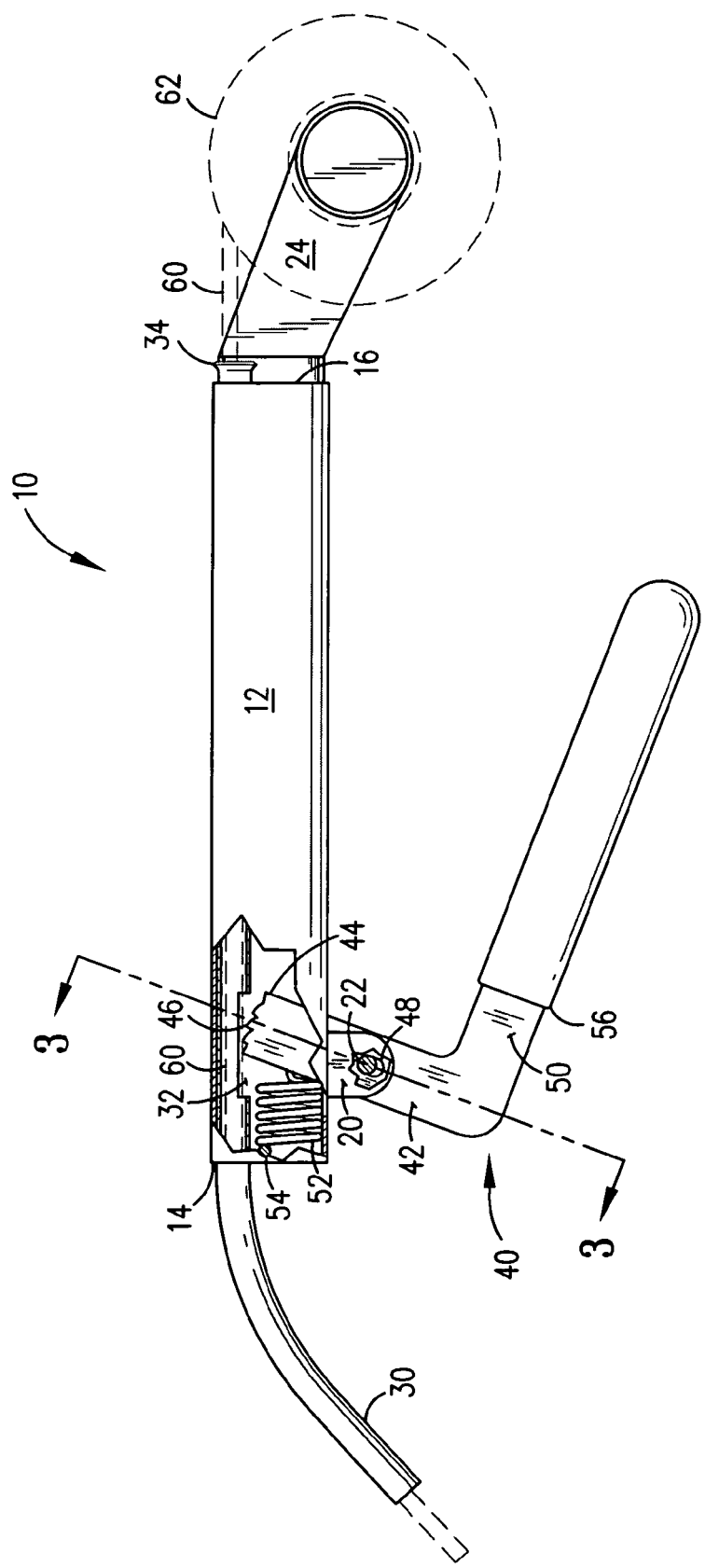
FIG. 2 is a side elevation view of the solder feeder of FIG. 1 shown partially in section.

FIG. 2 is a side elevation view of solder feeder 10, of FIG. 1 shown partially in section. Slot 32 in guide member 30 acts as a solder access window for the plurality of teeth 46 disposed on an edge 44 of short portion 42 of trigger 40. The plurality of teeth 46 being beveled and sharp. The novel "L" shaped design of trigger 40 with its integrated short portion 42 and long portion 50 in combination with the plurality of teeth 46 allows it to be pivotally attached to housing 12 while cooperating with solder 60 passing through guide member 30 via slot 32. In its relaxed position, the plurality of teeth 46 are not in physical contact with the solder 60 thereby allowing the solder 60 to freely pass, without binding, through guide member 30 and to be readily rewound onto spool 62 as needed. When long portion 50 of trigger 40 is squeezed, only then, do the plurality of teeth 46 engage solder 60 causing it to advance. Due to the pivoting action where trigger 40 is slideable via elongated hole 48 about pivot 22, solder feeder 10 can operate without spring 52 biasing short portion 42 and without a need for spring retainer 54; ie. for mechanically advancing and for retracting solder 60 using a single moving part, trigger 40; but will work more conveniently with spring 52 and spring retainer 54.

FIG. 3 is an enlarged cross sectional view of solder feeder 10 of FIG. 2 along the line 3-3. FIG. 3 shows details more clearly including housing member 12 which may have a hollow passage therein and may be a tube with guide member 30 fixed to the interior wall of housing member 12. Solder 60 is seen passing through guide member 30. Short portion 42 of trigger 40 passes through opening 18 in housing member 12 and through slot 32 in guide member 30 with plurality of teeth 46 on short portion 42 seen engaging solder 60. Spring 52 biases short portion 42 while spring retainer 54 secures spring 52 in housing member 12. Spring retainer 54, when used with spring 42, may alternately be a cap or any suitable closure disposed on the proximal end 14 of housing member 12. Short portion 42 is pivotally attached to housing member 12 via a tab 20, elongated hole 48 in trigger 40, and pivot 22. Trigger 40 having been attached as such, is allowed to slide and pivot such that solder 60 may be advanced or retracted depending upon whether trigger 40 is in a relaxed position or is squeezed.

EXAMPLE

A working prototype solder feeder fabricated from available copper tubing and metal was actually reduced to practice in accordance with the teachings of the invention. A plurality of teeth, beveled and sharp, were cut onto an edge of a short portion of an "L" shaped trigger. The trigger, being the only moving part, was pivotally attached to the tubing housing. The short portion passed through an opening in the tubing housing, which also served as a handle, and the plurality of teeth engaged solder in a guide tube via a slot through which solder was accessible for feeding. An elongated hole in the short section allowed the trigger to move vertically and horizontally to selectively contact the solder. Tests results showed that solder advanced and was easily rewound onto a spool of solder, after soldering without binding, responsive to trigger activation. Soldering of a workpiece was accomplished quickly, safely, effortlessly and without solder waste. Although not needed for operation, it was recognized that finger grips and friction increasing material could be added to a long portion of the trigger. Also not necessary for operation, addition of a spring cooperating with the trigger and a spring retainer was found to allow the trigger to return.

Solder feeder 10, in the illustrative embodiment, may be fabricated, preferably from metal and nonmetal. Housing member 12, guide member 30, trigger 40 and bracket 24 may be fabricated from a material chosen from the group consisting of metal and plastic.

To use solder feeder 10, solder 60 is inserted into guide member 30 at distal end 16 of housing member 12 and fed until it engages the plurality of teeth 46 on short portion 42 of trigger 40 and squeezing trigger 40 until solder 60 exits guide member 30 beyond proximal end 14 of housing member 12. If excess solder 60 is dispensed, with trigger 40 relaxed, solder 60 may be freely retracted.

The applicant has recognized a need and has solved a heretofore unknown problem in the prior art in creating a solder feeder 10. Surprisingly, the instant invention provides an added advantage and recognizes a problem and adequately and completely addresses an unfulfilled need, in that solder feeder 10 in the manner disclosed, in effect, defines a highly functional and useful apparatus capable of mechanically advancing and retracting solder using a single moving part, that is not presently available. This is due entirely to the particular way the applicant designed and fabricated solder feeder 10 disclosed herein which are not found or taught in the prior art. By doing so, the applicant is able to use inexpensive materials in the fabrication without sacrificing performance, rather, achieving superior unexpected results, due to the particular construction which is cost effective.

One practical advantage of the invention is that it provides a convenient, practical, low cost, portable, light weight solder feeder 10 which allows a user to conveniently, and in an efficient and safe manner, solder a plumbing fixture or the like. Another advantage is the simplicity of design and operation of solder feeder 10. Another advantage is the capability of being able to advance and freely rewind the solder 60 onto the spool 62 or source without binding or interference using a single moving part; trigger 40. Another advantage is that solder feeder 10, unlike known solder feeders, can be used independently of a particular soldering device. Still another advantage is that solder feeder 10 is designed for ease of manufacture by standard methods such as by metal working and by plastic molding and by using readily available materials particularly chosen for the problem solved.

Although the above disclosure has described the feeding of solder 60, it is understood that solder feeder 10 may be adapted to dispense other spooled or unspooled materials not limited to solder 60 such as welding rods, wire, string, plastic strands and confectionery food stuffs. For example, solder feeder 10 may be sized and miniaturized for use by hobbyists, for soldering electronic components; for confectionery use in the culinary arts; and in arts and crafts.

Of course, a wide variety of further uses and advantages of the present invention will become apparent to one skilled in the art. As disclosed, it is apparent that one skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain illustrative embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A solder feeder comprising:
   a housing member having a proximal end and a distal end, a tab, having a pivot therein, depending externally from said housing member and said tab cooperatively straddling an opening in a wall near said proximal end of said housing member;
   a guide member having a slot in a wall therein disposed opposite to and in cooperative alignment therewith the opening in said wall of said housing member and with said tab; said guide member disposed on an interior wall linearly extending from said distal end to said proximal end of said housing member completely enclosed therein and curvilinearly exiting from said proximal end of said housing member; and
   a trigger having in combination a short portion with a long portion formed as a single piece; said short portion disposed 90 degrees from said long portion; said trigger slideably attached to the pivot in said tab and cooperating with an elongated hole vertically oriented therein said short portion; said short portion having a plurality of teeth formed on a flat edge thereof; said short portion extending through the opening in said wall in said housing and through the slot in said guide tube; and said long portion extending externally substantially parallel to both said housing member and to said guide member wherein said trigger allows for mechanically advancing and for retracting solder using a single moving part.

2. The solder feeder of claim 1 wherein said housing member is a tube.

3. The solder feeder of claim 1 wherein said guide member is a tube.

4. The solder feeder of claim 1 wherein said trigger is "L" shaped.

5. The solder feeder of claim 1 further comprising a spring, disposed on a bottom wall at said distal end of said housing member and within said housing member opposite the slot in said guide member; said spring cooperating with said trigger and biased against a toothless edge of said short portion.

6. The solder feeder of claim 5 further comprising a spring retainer disposed in close proximity to said proximal end of said housing member.

7. The solder feeder of claim 1 further comprising a bracket disposed on said distal end of said housing member irremovably fixed to and angularly extending from and disposed below said housing member at said distal end.

8. The solder feeder of claim 1 further comprising a friction increasing material disposed on said long portion of said trigger.

9. A solder feeder comprising:
   a housing member having a proximal end and a distal end, a hollow longitudinal circular passage therethrough, an opening in a wall, a tab, having a pivot therein, depending externally from said housing member; said tab cooperatively straddling the opening in said wall of said housing member; and said tab and the opening in said wall each disposed in close proximity to said proximal end of said housing;
   a guide member having a hollow longitudinal circular passage therein; said guide member having a slot in a wall therein disposed opposite to and in cooperative alignment therewith the opening in said wall of said housing member and with said tab; said guide member fixed to an interior wall of said housing member linearly extending from said distal end to said proximal end of said housing member completely enclosed therein and disposed parallel to said housing member and curvilinearly exiting from said proximal end of said housing member;
   a bracket irremovably fixed to and angularly extending from and disposed below said housing member at said distal end; and
   a trigger having in combination a short portion with a long portion formed as a single piece; said short portion disposed 90 degrees from said long portion; said trigger slideably attached to the pivot in said tab and cooperating with an elongated hole vertically oriented therein said short portion; said short portion having a plurality of teeth formed across a width on a flat part of an edge thereof; said short portion extending through the opening in said wall in said housing and through the slot in said guide tube; said plurality of teeth on said short portion extending into the slot in said guide member and partially extending into said guide member and said long portion extending externally and substantially parallel to both said housing member and to said guide member
   wherein said trigger allows for mechanically advancing and for retracting solder using a single moving part.

10. The solder feeder of claim 9 further comprising a spring disposed on a bottom wall at said distal end of said housing member and within said housing member opposite the slot in said guide member; said spring cooperating with said trigger and biased against a toothless edge of said short portion.

11. The solder feeder of claim 10 further comprising a spring retainer disposed in close proximity to said proximal end of said housing member.

12. A method of fabricating a solder feeder comprising the steps:
   providing a housing member having a proximal end and a distal end; an opening in a wall therein; a tab, having a pivot therein, depending externally from said housing member and said tab cooperatively straddling the opening in said wall near said proximal end of said housing member;
   providing a guide member having a slot in a wall therein disposed opposite to and in cooperative alignment therewith the opening in said wall of said housing member and with said tab; said guide member disposed on an interior wall linearly extending from said distal end to said proximal end of said housing member completely enclosed therein and curvilinearly exiting from said proximal end of said housing member;
   providing a trigger having in combination a short portion with a long portion; said short portion disposed 90 degrees from said long portion formed as a single piece; said trigger slideably attached to the pivot in said tab and cooperating with an elongated hole vertically oriented therein said short portion; said short portion having a plurality of teeth formed on a flat edge thereof; said short portion extending through the opening in said wall in said housing and through the slot in said guide tube; and said long portion extending externally substantially parallel to both said housing member and to said guide member; and providing a bracket irremovably fixed to and angularly extending from and disposed below said housing member at said distal end wherein said trigger allows for mechanically advancing and for retracting solder using a single moving part.

13. The method of claim 12 further comprising the step of providing a spring disposed on a bottom wall at said distal end of said housing member and within said housing member opposite the slot in said guide member; said spring cooperating with said trigger and biased against a toothless edge of said short portion of said trigger and a spring retainer abutting against said spring.

14. A method of using a solder feeder to dispense solder comprising the steps:

providing a solder feeder having a housing member having a proximal end and a distal end; an opening in a wall therein; a tab, having a pivot therein, depending externally from said housing member; a guide member for receiving solder having a slot in a wall therein disposed opposite to and in cooperative alignment therewith the opening in said wall of said housing member and with said tab; said guide member disposed on an interior wall linearly extending from said distal end to said proximal end of said housing member completely enclosed therein and curvilinearly exiting from said proximal end of said housing member; and a trigger having in combination a short portion with a long portion formed as a single piece; said short portion disposed 90 degrees from said long portion; said trigger slideably attached to the pivot in said tab and cooperating with an elongated hole vertically oriented therein said short portion; said short portion having a plurality of teeth formed on a flat edge thereof; said short portion extending through the opening in said wall in said housing and through the slot in said guide tube; and said long portion extending externally substantially parallel to both said housing member and to said guide member wherein said trigger allows for mechanically advancing and for retracting solder using a single moving part;

inserting the solder into said guide member at said distal end of said housing member;

feeding the solder until it engages said plurality of teeth on said short portion of said trigger; and squeezing said trigger until the solder exits said guide member beyond said proximal end of said housing member.

\* \* \* \* \*